United States Patent Office 3,812,087
Patented May 21, 1974

3,812,087
VULCANIZATION OF EPDM ELASTOMERS
Jean-Paul Dillenschneider, Beaumont, France, assignor to Compagnie Generale des Etablissements Michelin raison sociale Michelin & Cie, Clermont-Ferrand, Puy-de-Dome, France
No Drawing. Continuation-in-part of abandoned application Ser. No. 114,389, Feb. 10, 1971. This application Feb. 11, 1972, Ser. No. 225,624
Claims priority, application France, Feb. 10, 1970, 7004742
Int. Cl. C08f 27/06
U.S. Cl. 260—79.5 C          6 Claims

ABSTRACT OF THE DISCLOSURE

Vulcanizates of EPDM elastomers having good bonding strength when directly bonded to metal parts, such as brass-plated steel cables used in automobile tires, are obtained from vulcanizable compositions comprising an EPDM elastomer, sulfur, zinc oxide or cadmium oxide and either a directly added or, preferably, an in situ prepared dialkyl dithiocarbamate of a metal of Group 1a or Group 2a of the Mendeleev Periodic Table.

---

This application is a continuation-in-part application of my copending U.S. application Ser. No. 114,389, filed Feb. 10, 1971, and now abandoned.

The present invention relates to vulcanizable mixtures containing an elastomer base of the ethylene-propylene type having, after curing or vulcanization, good adherence to wires or cables of brass-plated steel, or, more generally, to any brass-plated metal surface. They are, therefore, well suited for the manufacture of tires, conveyor belts, pipes and other rubber articles reinforced with steel wires or cables.

Elastomers of the ethylene-propylene terpolymer type, also known under the name "EPDM," are, as is known, terpolymers of ethylene, propylene and a nonconjugated diene. Their composition may vary within wide limits and comprises by weight 30% to 90% of ethylene, 10% to 70% of propylene, and 1% to 20% of diene. The cyclic or linear nonconjugated diene may be, for instance, dicyclopentadiene, octadiene, ethylidene norbornene, tetrahydroindene, hexadiene-1,4, etc.

These elastomers have certain advantages, particularly their resistance to aging and oxidation, related on the one hand to their low unsaturation and on the other hand to the position of the double bonds with respect to the chain. As a result, their use in the rubber industry, particularly in tires, may be of interest. However, they have one serious drawback which has up to now restricted their field of use; when cured, they have poor adherence to metal surfaces, and in particular to wires or cables of brass-plated steel. To give an idea, the following vulcanizable mixture, which is entirely conventional:

| Ingredients: | Parts by weight |
|---|---|
| EPDM | 100 |
| FEF black | 85 |
| Plasticizer | 35 |
| Zinc oxide | 10 |
| Sulfur | 3 |
| Tetramethyl thiuram monosulfide | 1.5 |
| Mercaptobenzothiazole | 0.75 | cured or vulcanized for 30 minutes at 160° C. in contact under pressure with a brass-plated steel cable, has a bonding strength of not more than 20 to 30 kg., whatever the type of commercial EPDM used.

By bonding strength there is meant the force necessary to remove a brass-plated steel cable comprising 7 strands of 4 wires of $18/100$ mm. in diameter, which has been bonded over a length of 1 cm. to two testpieces of rubber by placing it between said testpieces during their vulcanization under pressure. The bonding strength to metal of vulcanized mixtures having a base of diene rubber is more than 50 kg., which is far greater than the bonding strength of the conventional vulcanized EPDM mixtures.

With regard to bonding to brass-plated steel cables, mixtures having a base of EPDM behave differently, not only from a quantitative standpoint but also from a qualitative standpoint. In the case of the EPDM elastomers, the separation of the cable and the rubber in a separation test takes place at the interface of the two materials and the cable is completely bared. On the other hand, in the case of adhesive mixtures having a base of diene rubbers, the separation takes place by tearing the rubber in the vicinity of the surface of the cable which is not bared. In this latter case one can truly speak of adherence of the rubber to the metal, while in the case of the EPDM's there is only an anchoring of the rubber in the infractuosities of the metal or of the assembly of metal parts. It can then be seen that the fatigue of the materials has a greater influence on the bonding in the case of the EPDM's.

The present invention is directed toward improving the adherence of vulcanized mixtures having a base of an ethylene-propylene terpolymer to metal surfaces, particularly wires or cables of brass-plated steel, so as to make it comparable quantitatively and qualitatively to that of mixtures having a base of diene rubbers. The present invention makes it possible to obtain this result without imparting to the vulcanizates unfavorable mechanical properties, such as too low a modulus of elasticity or too high a hysteresis loss, and without requiring less favorable conditions of production, particularly too long a time of curing or vulcanizing.

The sulfur-vulcanizable synthetic elastomer compositions of the invention, which are directly adherable to brass-plated steel when vulcanized in contact with it, comprise (1) 100 parts by weight of an EPDM elastomer; (2) from about 1 part to about 10 parts by weight of sulfur; (3) from about 5 parts to about 15 parts by weight of zinc oxide or cadmium oxide; and (4) from about 0.5 part to about 10 parts by weight of either a directly added or, preferably, an in situ prepared dialkyl dithiocarbamate of a metal of Group 1a or Group 2a of the Mendeleev Periodic Table wherein the alkyl groups have from 1 to 4 carbon atoms each. Representative examples of such suitable dithiocarbamates include the lithium, sodium, potassium, magnesium, calcium, strontium and barium salts of the dimethyl, diethyl, dipropyl and dibutyl dithiocarbamic acids.

The preferred compositions of the invention comprise (1) 100 parts by weight of an EPDM elastomer; (2) from about 1 part to about 10 parts by weight of sulfur; (3) from about 5 parts to about 15 parts by weight of zinc oxide or cadmium oxide; (4) from about 0.5 part to about 5 parts by weight of a precursor compound, namely, a tetraalkyl thiuram sulfide wherein the alkyl groups have from 1 to 4 carbon atoms each and/or a dialkyl dithiocarbamate of a metal other than the metals of Groups 1a and 2a of the Mendeleev Periodic Table wherein the alkyl groups have from 1 to 4 carbon atoms each; and (5) from about 0.5 part to about 10 parts by weight of another precursor compound, namely, an oxide or hydroxide or salt of a metal of Group 1a or Group 2a of the Mendeleev Periodic Table capable of giving rise in the compositions to a dialkyl dithiocarbamate of a metal of Group 1a or Group 2a of the Mendeleev Periodic Table wherein the alkyl groups have from 1 to 4 carbon atoms each.

Examples of the precursor compounds (5) which can be used are:

1. Among the oxides and hydroxides, the oxides and hydroxides—anhydrous or hydrated—of magnesium, calcium, strontium and barium.
2. Among the salts, the phosphate (orthophosphates), acetates and alcoholates of lithium, sodium, potassium, magnesium, calcium, strontium and barium.

The preferred precursor compounds (5) are compounds of barium and among them barium oxide. As a matter of fact, among the compounds tested, the best results have been obtained with barium oxide. Results which are superior to those of the prior art can, however, be obtained with other barium compounds or with compounds of metals of Groups 1a and 2a other than barium.

In the case of barium oxide, the optimum quantity is close to two parts by weight of BaO per 100 parts of EPDM elastomer when using a vulcanizing system comprising about 1 part of zinc diethyl dithiocarbamate (or an equivalent quantity of another dialkyl dithiocarbamate of a metal of a group of the Mendeleev Periodic Table other than Groups 1a and 2a), 1 part of tetramethyl thiuram monosulfide (or an equivalent quantity of an analogous compound), 2 to 4 parts of sulfur and 5 to 15 parts of zinc oxide.

The vulcanization advantageously takes place at a temperature of between 140° C. and 200° C., and preferably between 160° C. and 200° C. The vulcanization time is between 10 and 90 minutes, depending on the temperature.

The invention is illustrated by the following examples which show how it can be carried out and what results it makes possible to obtain.

EXAMPLE 1

The following masterbatch was prepared:

| Components: | Parts by weight |
|---|---|
| Nordel 1145* | 100 |
| Oil | 35 |
| FEF black | 85 |
| Zinc oxide | 10 |
| Total | 230 |

*Nordel 1145 is a commercial EPDM manufactured by Du Pont de Nemours, the composition by weight of which is as follows:

| | Percent |
|---|---|
| Ethylene | 64 |
| Propylene | 32 |
| Hexadiene | 4 | and the Mooney (ML 1+4) viscosity of which is 68 at 120° C.

With this masterbatch there was formed three mixtures the composition and properties of which, after vulcanization for 30 minutes at 160° C., are given in Table I below:

TABLE I

| Mixture | 1 | 2 | 3 |
|---|---|---|---|
| Parts by weight | | | |
| Masterbatch | 230 | 230 | 230 |
| Barium oxide (BaO) | 2 | 2 | |
| Sulfur | 3 | 3 | 3 |
| Tetramethyl thiuram monosulfide | 1 | 1.5 | 1.5 |
| Mercaptobenzothiazole | | 0.7 | 0.7 |
| Zinc diethyl dithiocarbamate | 1 | | |
| Bonding strength (kg.) | 53 | 27 | 17 |
| Modulus (g./mn.²)* | 282 | 328 | 345 |
| Loss (percent)** | 31 | 29 | 30 |

*The modulus of elasticity is measured for an elongation of 100% upon the fourth traction of the testpiece.
**The loss (percentage of energy absorbed during a deformation) is measured at 60° C. by rebound of a pendulum which strikes the testpiece.

Vulcanized Mixtures 1 and 2 in accordance with the invention have a bonding strength on brass-plated steel cable which is much greater than that of the conventional vulcanized Mixture 3. Furthermore, vulcanized Mixtures 1 and 2, and particularly Mixture 1, separate from the steel cable only by tearing of the rubber.

A comparison of vulcanized Mixtures 1 and 2 on the one hand and vulcanized Mixtures 1 and 3 on the other hand shows the existence of a conjugated action of the barium oxide and the accelerator system.

EXAMPLE 2

In this example various precursor compounds of the metals of Groups 1a and 2a are compared. The same masterbatch and vulcanization system was used as in Mixture 1 of Example 1, the barium oxide being replaced by other precursor compounds.

The compositions and bonding strengths are indicated in Table II:

TABLE II

| Mixture | 1 | 2 | 3 | 4 | 5 |
|---|---|---|---|---|---|
| Parts by weight | | | | | |
| BaO | 2 | | | | |
| CaO | | 1 | | | |
| MgO | | | 0.5 | | |
| Na₃PO₄ | | | | 5 | |
| CH₃COONa | | | | | 3 |
| Bonding strength (kg.) | 53 | 38 | 34 | 43 | 35 |

As can be seen, calcium or magnesium oxides and sodium salts make it possible to obtain vulcanized mixtures having a bonding strength less than that produced by barium oxide but definitely superior to that of a conventional mixture, such as Mixture 3 described in Example 1.

EXAMPLE 3

In this example directly added dialkyl dithiocarbamates of metals of Groups 1a or 2a are used (Mixtures 3–5).

Mixtures 1 to 5 below were prepared from the same masterbatch as in Example 1. The compositions of these mixtures and the bonding strengths obtained after curing for 60 minutes at 160° C. are given in Table III below:

TABLE III

| Mixture | ¹1 | 2 | 3 | 4 | 5 |
|---|---|---|---|---|---|
| Parts by weight: | | | | | |
| Masterbatch | 230 | 230 | 230 | 230 | 230 |
| Barium oxide | 2 | | | | |
| Sulfur | 3 | 3 | 3 | 3 | 3 |
| Tetramethyl thiuram monosulfide | 1 | 1 | 1 | 1 | 1 |
| Zinc diethyl dithiocarbamate | 1 | 1 | | | |
| Barium diethyl dithiocarbamate | | | 1 | | |
| Calcium diethyl dithiocarbamate | | | | 1 | |
| Magnesium diethyl dithiocarbamate | | | | | 1 |
| Bonding strength (kg.) | 53 | 24 | 36 | 35 | 30 |

¹ Control.

A comparison of Mixtures 1 and 2 shows that the elimination of the barium oxide results in a considerable drop in the bonding strength.

If one then adds a metal of Group 1a or Group 2a in the form of a dialkyl dithiocarbamate, one again obtains relatively high bonding strengths. The result is, however, slightly better with barium dialkyl dithiocarbamate. However, the best result is given by Mixture 1 in which the barium dialkyl dithiocarbamate is obtained in situ from barium oxide.

EXAMPLE 4

This example shows the influence of the quantity of the precursor compound of the metal of Group 1a or Group 2a.

With the use of the masterbatch of Example 1 various mixtures were prepared which differ from Mixture 1 of that example by the amount of barium oxide used. After curing for 30 minutes at 160° C., the following properties were noted as a function of the amount of barium oxide:

TABLE IV

| Barium oxide (parts per 100 parts EPDM) | 0 | 0.5 | 1 | 2 | 3 | 5 |
|---|---|---|---|---|---|---|
| Bonding strength (kg.) | 25 | 35 | 43 | 53 | 52 | 53 |
| Modulus (g./mm.²)* | 282 | 292 | 305 | 282 | 262 | 231 |
| Loss (percent)* | 33 | 31.5 | 31.5 | 31 | 32 | 34 |

*Measured as in Example 1.

As can be seen, an amount of barium oxide close to 2 parts per 100 parts of EPDM elastomer gives the best results.

EXAMPLE 5

In this example the role of the zinc oxide is shown. Different mixtures were prepared similar to Mixture 1 of Example 1, it differing only in the amount of zinc oxide. After vulcanization for 30 minutes at 160° C., the following properties were found as a function of the amount of zinc oxide:

TABLE V

| Zinc oxide (parts per 100 parts EPDM) | 0 | 5 | 10 | 13 |
|---|---|---|---|---|
| Bonding strength (kg.) | 21 | 49 | 53 | 51 |
| Modulus (g./mm.²) | 185 | 269 | 282 | 298 |
| Loss (percent) | 43 | 32 | 31 | 31 |

Zinc oxide is thus indispensable for obtaining good adherence and good vulcanization.

However, the zinc oxide could be replaced by cadmium oxide.

EXAMPLE 6

In this example, the role of the quantity of sulfur is shown. Different mixtures were prepared similar to Mixture 1 of Example 1, it differing only in the amount of sulfur. After vulcanization for 30 minutes at 160° C. the following properties as are noted:

TABLE VI

| Sulfur (parts per 100 parts EPDM) | 1 | 2 | 3 | 5 |
|---|---|---|---|---|
| Bonding strength (kg.) | 37 | 48 | 53 | 48 |
| Modulus (g./mm.²) | 178 | 261 | 282 | 304 |
| Loss (percent) | 42 | 33 | 31 | 31 |

A sulfur content of between 2 and 5 parts per 100 parts of EPDM elastomer is suitable. The best compromise is in the vicinity of 3% sulfur.

EXAMPLE 7

The purpose of this example is to show that the invention applies to all types of EPDM. Various mixtures were prepared differing from the Mixture 1 of Example 1 only by the type of EPDM employed. The following Table VII sets forth the main properties:

TABLE VII

| Type of EPDM (commercial name) | Bonding strength (kg.) | Modulus (g./mm.²) | Loss at 20° C. (percent) |
|---|---|---|---|
| Nordel 1070 | 49 | 220 | 42 |
| Nordel 1470 | 49 | 270 | 37 |
| Nordel 1145 | 54 | 260 | 42 |
| EPT 4608 | 53 | 275 | 44 |
| Keltan 120 | 59 | 313 | 43 |
| Epsyn 70 | 49 | 242 | 44 |
| Epsyn 70 A | 58 | 356 | 36 |
| Epsyn 55 | 55 | 445 | 3 |

As can be seen, the bonding strengths obtained are comparable. The characteristics of the different EPDM's cited above are as follows:

There was used for this purpose the following mixture:

| | Parts by weight |
|---|---|
| EPDM (Nordel 1145) | 100 |
| Carbon black | (¹) |
| Oil extender | (¹) |
| Zinc oxide | 13 |
| Barium oxide | 2 |
| Sulfur | 3 |
| Zinc diethyl dithiocarbamate | 1 |
| Tetramethyl thiuram monosulfide | 1 |

¹ Variable.

The following Table VIII gives the properties obtained after curing for 30 minutes at 160° C. as a function of the quantities of carbon black and oil extender:

TABLE VIII

| Mixture | 1 | 2 | 3 | 4 | 5 | 6 |
|---|---|---|---|---|---|---|
| Parts by weight: | | | | | | |
| Black FEF | 85 | 85 | 100 | | | 85 |
| Black HAF | | | | 85 | | |
| Black ISAF HS | | | | | 85 | |
| Oil extender | 20 | 33 | 40 | 30 | 30 | 50 |
| Bonding strength (kg.) | 57 | 55 | 52 | 53 | 49 | 53 |
| Modulus (g./mm.²)* | 400 | 280 | 310 | 300 | 260 | 187 |
| Loss at 60° C. (percent)* | 32 | 32 | 35 | 38 | 43 | 32 |

*Measured in the same manner as in Example 1.

As is seen, one can obtain high bonding strengths even with large amounts of carbon black and oil extender.

Mixture 5 above was used for the coating of the metal wires of a tire made entirely of EPDM. The performances of this tire, of the radial ZX type, of size 165 x 15, were compared with those of a commercial tire of the same type and size made of diene elastomers. The endurance under a load of 500 kg. exceeded 40,000 kilometers, as in the case of the control. The limit speed exceeded, also in the same way as the control, 200 kilometers/hour. The EPDM base steel bonding mixtures in accordance with the invention are thus comparable to the bonding mixtures having a base of diene rubbers which are used commercially.

It goes without saying that the EPDM could also be extended to a compatible extent by another elastomer without going beyond the scope of the present invention, even though the compounds, particularly barium compounds, to be added in accordance with the invention, do not improve the bonding power of the other elastomers.

EXAMPLE 9

TABLE IX

| Mixture | 1 | 2 | 3 |
|---|---|---|---|
| Parts by weight: | | | |
| Masterbatch (same as in Example 1) | 230 | 230 | 230 |
| Barium oxide (BaO) | 2 | 2 | 2 |
| Sulfur | 3 | 3 | 3 |
| Tetramethyl thiuram monosulfide | 1 | 1.58 | 0 |
| Zinc diethyl dithiocarbamate | 1 | 0 | 2.74 |
| Bonding strength (kg.) | 53 | 39 | 50 |
| Modulus (g./mm.²)* | 282 | 333 | 297 |
| Loss (percent)* | 31 | 34.6 | 32.4 |

*Measured in the same manner as in Example 1.

| | Percent | | | | Mooney, ML 1+4, at 120° C. |
|---|---|---|---|---|---|
| | Propylene | Ethylene | Diene | Nature of diene | |
| Nordel 1070 | 42 | 54 | 4 | Hexadiene, 1-4 | 83 |
| Nordel 1470 | 39 | 54 | 7 | do | 82 |
| Nordel 1145 | 32 | 64 | 4 | do | 68 |
| EPT 4608 | 39 | Not shown | | Ethylidene-N-bornene | 97 |
| Keltan 120 | 40 | 42 | 8 | Dicyclopentadiene | 93 |
| Epsyn 70 | 42 | 54 | 4 | Ethylidene-N-bornene | 97 |
| Epsyn 70 A | 43 | 50 | 7 | do | 100 |
| Epsyn 55 | 44 | 45 | 11 | do | 84 |

EXAMPLE 8

In this example the influence of the quantity and quality of the carbon black is shown as well as the quantity of oil extender.

1 part of tetramethyl thiuram monosulfide and 1 part of zinc diethyl dithiocarbamate are the same molar amount as 1.58 parts of tetramethyl thiuram monosulfide or 2.74 parts of zinc diethyl dithiocarbamate. This example shows that although it is preferable to use both compounds, acceptable results are obtained when using the same molar amount as any of them, especially when zinc diethyl dithiocarbamate is used.

Why the results are quantitatively different is not understood. However, the fact that they are qualitatively similar may be explained by the fact that tetramethyl thiuram monosulfide, the formula of which is

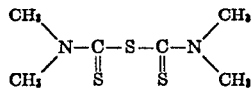

reacts with S and ZnO or BaO to give zinc or barium dimethyl dithiocarbamate, the formulae of which are

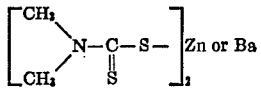

and that zinc dimethyl dithiocarbamate reacts also with BaO to give in situ barium dimethyl dithiocarbamate.

What is claimed is:

1. A sulfur-vulcanizable synthetic elastomer composition, which is directly adherable to brass-plated steel when vulcanized in contact with it, consisting essentially of:
   (1) 100 parts by weight of an EPDM elastomer;
   (2) from about 1 part to about 10 parts by weight of sulfur;
   (3) from about 5 parts to about 15 parts by weight of zinc oxide or cadmium oxide; and
   (4) from about 0.5 part to about 10 parts by weight of a directly added or an in situ prepared dialkyl dithiocarbamate of a metal of Group 1a or Group 2a of the Mendeleev Periodic Table wherein the alkyl groups have from 1 to 4 carbon atoms each.

2. A sulfur-vulcanizable synthetic elastomer composition, which is directly adherable to brass-plated steel when vulcanized in contact with it, consisting essentially of:
   (1) 100 parts by weight of an EPDM elastomer;
   (2) from about 1 part to about 10 parts by weight of sulfur;
   (3) from about 5 parts to about 15 parts by weight of zinc oxide or cadmium oxide;
   (4) from about 0.5 part to about 5 parts by weight of at least one precursor compound selected from the group consisting of a tetraalkyl thiuram sulfide wherein the alkyl groups have from 1 to 4 carbon atoms each and a dialkyl dithiocarbamate of a metal other than the metals of groups 1a and 2a of the Mendeleev Periodic Table wherein the alkyl groups have from 1 to 4 carbon atoms each; and
   (5) from about 0.5 part to about 10 parts by weight of another precursor compound selected from the group consisting of an oxide, hydroxide or salt of a metal of Group 1a or Group 2a of the Mendeleev Periodic Table, capable of giving rise in the composition to a dialkyl dithiocarbamate of a metal of Group 1a or Group 2a of the Mendeleev Periodic Table wherein the alkyl groups have from 1 to 4 carbon atoms each.

3. The sulfur-vulcanizable synthetic elastomer composition, which is directly adherable to brass-plated steel when vulcanized in contact with it, as defined by claim 2 wherein the precursor compound (5) is a barium compound.

4. The sulfur-vulcanizable synthetic elastomer composition, which is directly adherable to brass-plated steel when vulcanized in contact with it, as defined by claim 3 wherein the barium compound is barium oxide.

5. The sulfur-vulcanizable synthetic elastomer composition, which is directly adherable to brass-plated steel when vulcanized in contact with it, as defined by claim 4 wherein the barium oxide compound is present in an amount of about 2 parts by weight.

6. A sulfur-vulcanizable synthetic elastomer composition, which is directly adherable to brass-plated steel when vulcanized in contact with it, consisting essentially of:
   (1) 100 parts by weight of an EPDM elastomer;
   (2) about 3 parts by weight of sulfur;
   (3) about 10 parts by weight of zinc oxide;
   (4) about 1 part by weight of tetramethyl thiuram monosulfide;
   (5) about 1 part by weight of zinc diethyl dithiocarbamate; and
   (6) about 2 parts by weight of barium oxide.

References Cited
UNITED STATES PATENTS
| | | | |
|---|---|---|---|
| 3,413,273 | 11/1968 | Alicot | 260—79.5 |
| 3,565,870 | 2/1971 | Iino | 260—79.5 |
| 3,595,841 | 7/1971 | Apotheker | 260—79.5 |

FOREIGN PATENTS
| | | | |
|---|---|---|---|
| 380,774 | 9/1923 | Germany | 260—793 |

HARRY WONG, Jr., Primary Examiner

U.S. Cl. X.R.

117—128.4, 132; 161—217; 260—41.5 R, 79.5 B

PO-1050
(5/69)

UNITED STATES PATENT OFFICE
CERTIFICATE OF CORRECTION

Patent No. 3,812,087          Dated May 21, 1974

Inventor(s)  Jean-Paul Dillenschneider

It is certified that error appears in the above-identified patent and that said Letters Patent are hereby corrected as shown below:

Column 3, line 64, "Modulus $(g./mn.^2)$*" should be -- Modulus $(g./mm.^2)$* --. Column 5, line 27, delete "as"; line 8 of Table VII, under the caption reading "Loss at 20°C. (percent)", "3" should be --38--; in the second part of Table VII, under the caption "Ethylene", "not shown" should be -- not known --; and in the second part of Table VII, under the caption "Propylene", "Keltan 120   40" should be -- Keltan 120  50 --.

Signed and sealed this 17th day of September 1974.

(SEAL)
Attest:

McCOY M. GIBSON JR.
Attesting Officer

C. MARSHALL DANN
Commissioner of Patents